Dec. 29, 1964   E. L. GRINDLE   3,163,232
HYDRAULIC PROPELLER SYSTEM
Filed July 18, 1957   6 Sheets-Sheet 1

INVENTOR.
Eugene L. Grindle
BY
Attorneys

Fig. 3

INVENTOR.
Eugene L. Grindle
BY
Attorneys

Fig. 7

INVENTOR.
Eugene L. Grindle
BY
Attorneys

United States Patent Office 3,163,232
Patented Dec. 29, 1964

3,163,232
HYDRAULIC PROPELLER SYSTEM
Eugene L. Grindle, San Mateo, Calif., assignor to United Aircraft Corporation, East Hartford, Conn., a corporation of Delaware
Filed July 18, 1957, Ser. No. 672,630
4 Claims. (Cl. 170—160.2)

This invention relates generally to a hydraulic propeller system and more particularly to apparatus for feathering a propeller on an airplane by bypassing the governor.

It is customary to provide means on airplanes for feathering the propellers in the event of trouble in a power package. This is particularly important in the case of a runaway propeller which may be compounded by fire, excessive vibration, possible loss of the power package, etc., in addition to the tremendous drag on the plane created by the runaway propeller. Heretofore a large proportion of the causes for runaway propellers, uncontrollable propellers, and the inability to feather such propellers has been caused by malfunctioning of the governor associated with each of the propellers. For example, one of the most common failures in the governor is caused by metal chips or particles in the engine oil which is used by the governor. The metal chips or particles in the oil cause the pilot valve in the governor to seize or stick. Since the forces that can be applied to the pilot valve both mechanically through the governor rack or hydraulically from the auxiliary pump are very low, they are insufficient to move the pilot valve when it becomes stuck. When the pilot valve is stuck or seized, the propeller is uncontrollable and will run away because it cannot be feathered. In addition to a seized pilot valve the low pressure relief valve on the governor may become stuck in an open position which limits the pressure available on the forward side of the airplane propeller to such a low value that the centrifugal twisting movement of the propeller overcomes the pressure and causes the blades to go into an increased r.p.m. or a decreased blade angle condition and into an overspeed condition which cannot be feathered. The same type of thing occurs when the high pressure relief valve is stuck in an open position. This causes the output pressure of the governor pump to be short circuited to the input and prevents a sufficient build up of pressure to actuate the propeller piston. The same type of thing occurs also in the case of internal leakage in the governor or external leakage in the governor due to stud failures. This also prevents the supply of high pressure oil to the propeller to control it properly. Another cause of trouble in governors is the inadvertent actuation or energization of the reversing solenoid. When this occurs, the reversing cycle in the governor takes priority over everything else and all attempts to feather only result in the propeller being reversed in flight which is a very serious condition. Any one of these malfunctions of the governor may seriously impair operation of the plane and also may cause the plane to crash as has been the case in many instances.

In general, it is an object of the present invention to provide a propeller feathering apparatus which includes additional means for feathering that bypasses the governor.

Another object of the invention is to provide apparatus of the above character which does not affect the conventional operation of the governor.

Another object of the invention is to provide apparatus of the above character in which feathering can be accomplished through the governor in the event of failure of additional feathering means.

Another object of the invention is to provide apparatus of the above character in which the additional feathering means is relatively simple and trouble free.

Another object of the invention is to provide apparatus of the above character in which substantially no pressure drop occurs in the additional feathering means during feathering.

Another object of the invention is to provide apparatus of the above character which can be incorporated into an existing governor.

Another object of the invention is to provide apparatus of the above character which may be incorporated into an existing engine installation by placing a sandwich assembly between the existing governor and the engine pad.

Another object of the invention is to provide apparatus of the above character in which the sandwich is secured to the engine pad independently of the governor.

A further object of the invention is to provide apparatus of the above character in which an indication is given to show when the auxiliary pump is operating and is putting out a predetermined pressure.

A still further object of the invention is to provide apparatus of the above character in which an indication is given as to whether feathering is taking place through the additional feathering means or through the governor.

Additional objects and features of the invention will appear from the following description in which the preferred embodiment has been set forth in detail in conjunction with the accompanying drawing.

Referring to the drawing.

In general, the present invention consists of providing additional feathering means independent of the governor which is comprised primarily of a valve assembly having valve means held in a normal position by engine oil pressure so that normal functions such as constant speed control, reversing, unreversing and unfeathering are all accomplished through the governor. Means is provided when it is desired to feather to cause auxiliary oil pressure to shift the valve means from its normal position against the engine oil pressure. Shifting of the valve means from its normal position isolates the governor from the propeller system and causes auxiliary oil pressure to be applied directly to the propeller to accomplish feathering. The valve assembly can be incorporated directly into the governor or can take the form of a sandwich placed between the governor and the engine pad.

Figure 1:
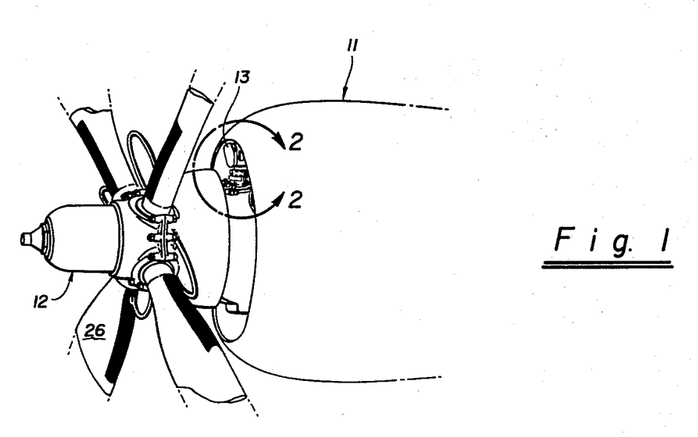
FIGURE 1 is an isometric view of a power package with my propeller feathering apparatus mounted thereon.
Figure 2:
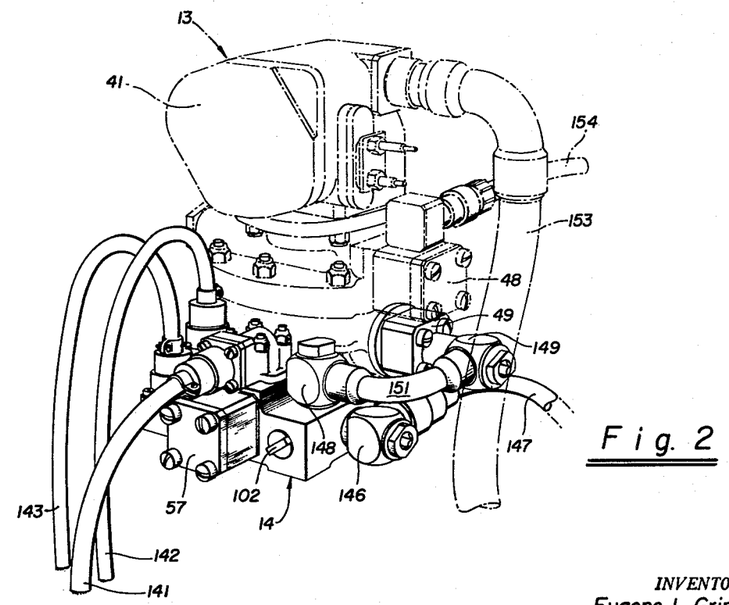
FIGURE 2 is an enlarged isometric view of the additional feathering means in the form of a sandwich and connected to a governor which is shown in phantom lines.

Referring now to FIGURES 1 and 2, I have shown the conventional power package 11 utilized on airplanes which includes a propeller assembly 12, a governor 13 and a governor bypass valve 14, the latter embodying the additional feathering means.

Figure 7:
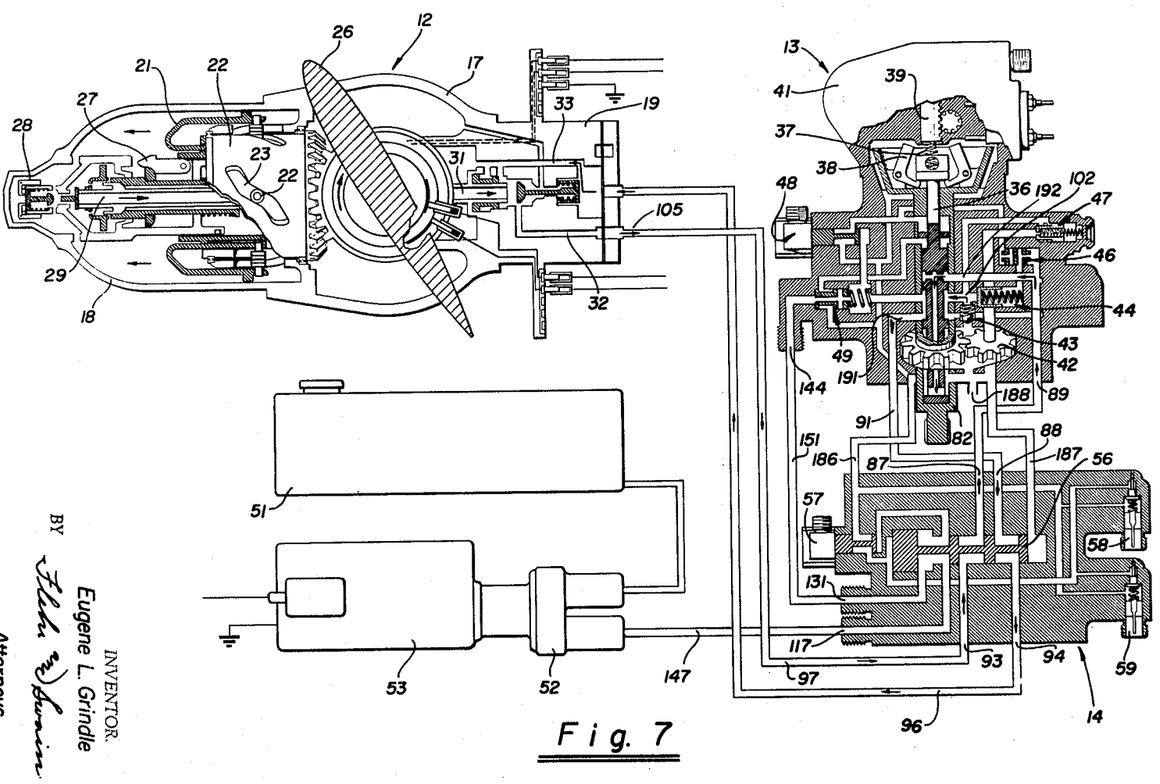
FIGURE 7 is a schematic diagram showing the operation of my propeller feathering apparatus in an underspeed condition of the propeller.

A schematic diagram of a reversing hydromatic propeller system including my governor bypass valve is shown in FIGURE 7. The propeller assembly 12 is conventional and may be of any suitable type such as the model 34E60–345 propeller assembly manufactured by Hamilton Standard or the propeller assembly shown in Patent No. 2,663,373. Such a propeller assembly may be comprised of a barrel assembly 17, a dome 18 and a transfer bearing 19 which also serves as an oil transfer housing. A piston 21 is slidably mounted in the dome and is provided with cam rollers 22 which ride in grooves 23 provided in a rotating cam 24. Rotation of the cam 24 serves to change the pitch of the blade 26 in a manner well known to those skilled in the art. A low pitch stop assembly 27 and a flyweight assembly 28 are provided in the dome. An oil passage 29 is centrally disposed in the dome and is connected to what may be termed the outboard side of the piston 21. The passage 29 communicates with passages 31 and 32 in the oil transfer housing. Another passage 33 is provided in the oil transfer housing and communicates with what may be termed the inboard side of the piston 21.

The hydromatic propeller system also includes a double acting constant speed control device or governor 13 which also may be of any suitable type such as model No. 5U18 constant speed control assembly supplied by Hamilton Standard or the governor or control unit shown in Patent No. 2,663,373. Such a governor may include a pilot valve 36 with lands 36a, 36b, 36c and 36d, the position of which is controlled by a speeder spring 37 in opposition to the forces exerted by the rotating flyweights 38. The position of the speeder spring 37 is adapted to be positioned by a speeder rack 39, the position of which is controlled by a stepmotor electric head 41. The stepmotor may be adjusted by manually operated means or by automatic synchronizing means well known to those skilled in the art.

Such a governor also includes a gear pump or booster pump 42 which is driven by the airplane engine. It also includes a ball check valve 43, a low pressure relief valve 44, a selector valve 46, a high pressure relief valve 47, a solenoid valve 48, and an auxiliary check valve 49 for purposes well known to those skilled in the art. The governor also includes numerous oil passage ports certain of which will hereinafter be described in detail.

The propeller system also includes an auxiliary oil supply which in FIGURE 7 is represented schematically as a tank 51, an auxiliary or feathering pump 52 and a motor 53 for driving the pump. The feathering motor and pump are substantially conventional and may be of any suitable type well known to those skilled in the art.

The governor bypass valve assembly which forms a part of the hydromatic propeller system consists generally of a shuttle valve 56, a solenoid valve 57, a pressure cutout switch 58 and a signal switch 59.

Figure 3:
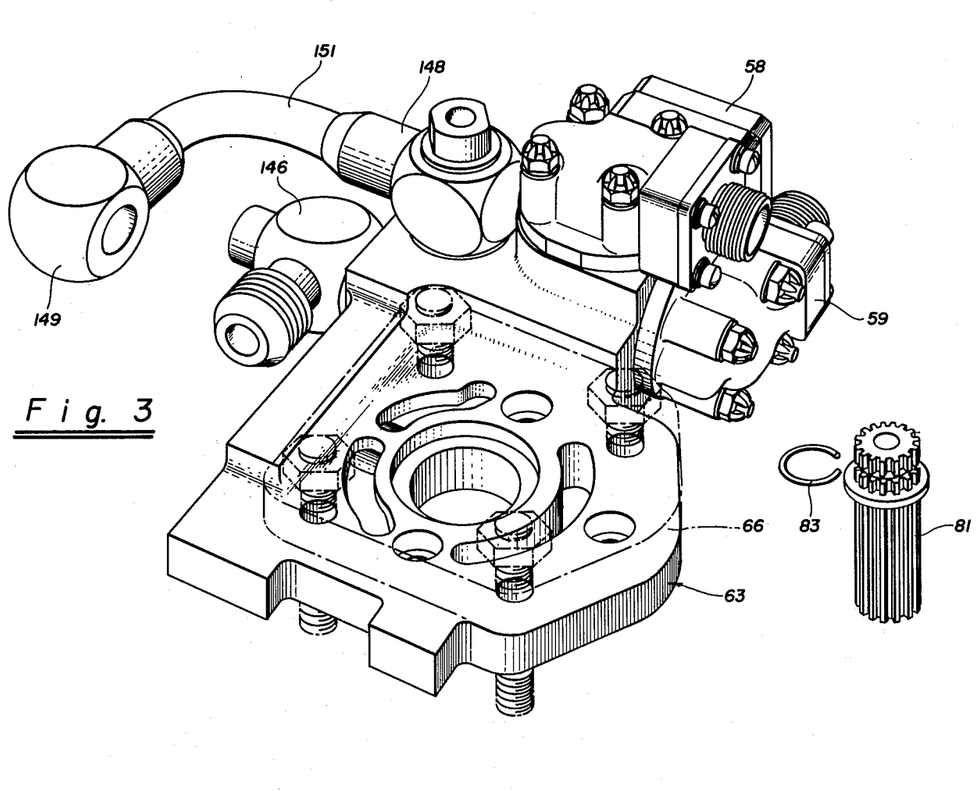
FIGURE 3 is an isometric view of the additional feathering means with electrical and mechanical connections removed and showing the base plate of the governor in phantom lines.
Figures 4, 5, 6:
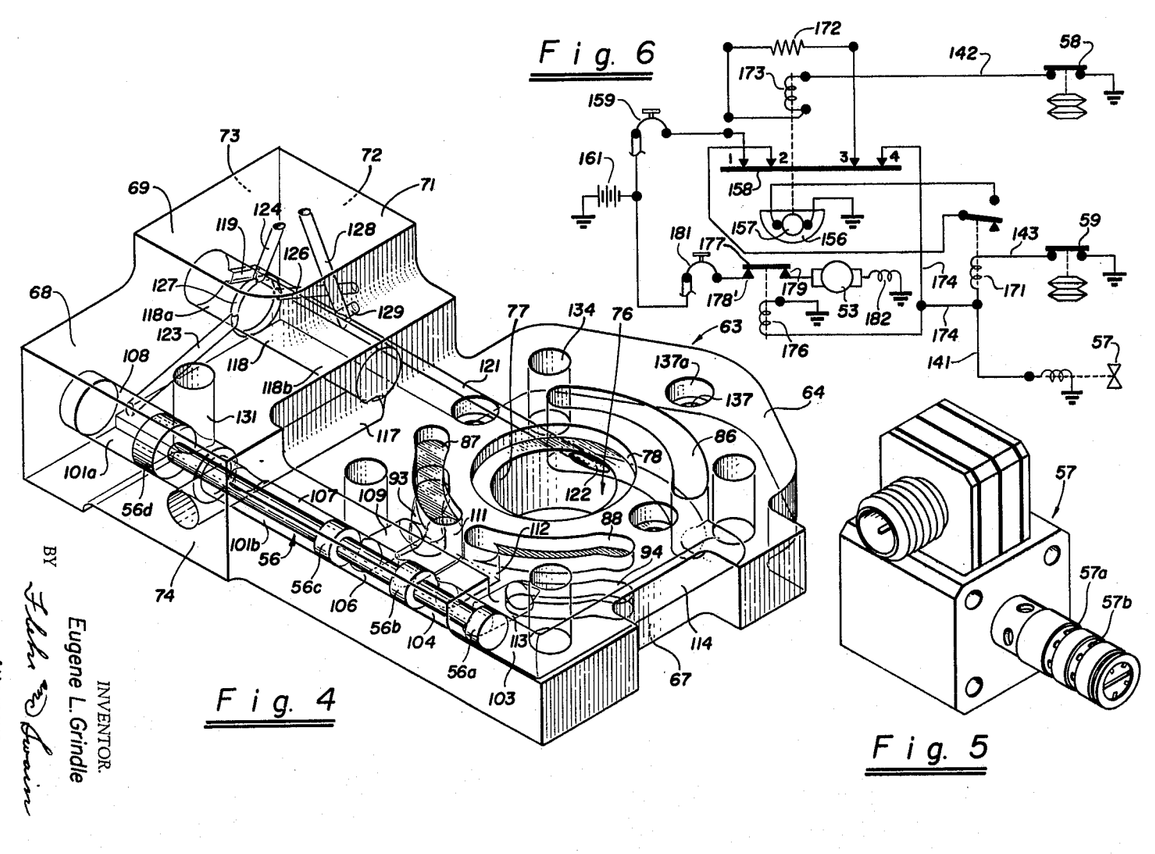
FIGURE 4 is an isometric view of the body or casing forming a part of the additional feathering means with the shuttle valve mounted in the casing.
FIGURE 5 is an isometric view of a solenoid actuated valve utilized in the additional feathering means.
FIGURE 6 is a circuit diagram with certain parts schematically illustrated showing the circuitry utilized in conjunction with the additional propeller feathering means.

As shown particularly in FIGURES 2, 3 and 4, the governor bypass valve assembly is embodied in the form of a sandwich or spacer plate which is adapted to be mounted between the base of the governor and the engine pad on the nose section of the power plant 11. It is to be understood however that instead of being embodied as a separate spacer plate the bypass valve may be incorporated as an integral part of the governor.

The governor bypass valve assembly 14 consists of a casing or body 63 formed as a sandwich or spacer plate as shown particularly in FIGURE 4. The casing has a flat upper surface 64 which is adapted to receive the base 66 of the governor, the base 66 being shown in phantom lines in FIGURE 3. The casing or body 63 is also provided with a flat lower surface 67 which is adapted to be mounted on the engine pad. The left hand end of the casing or body as viewed in FIGURE 4 is formed with raised portions 68 and 69 and flat surfaces 71, 72, 73 and 74 to accommodate fittings as hereinafter described.

The body is provided with a vertical bore 76 centrally disposed in the flat upper surface 64. A bushing 77 is mounted in the bore and is recessed from the upper surface 64 to provide an annular depression 78. The bushing 77 is of such a length that it protrudes a distance below the lower surface 67, a distance which is slightly less than the depth of the annular depression 78. The bushing 77 is mounted in this manner so that the governor bypass valve can be utilized in conjunction with existing governor installations.

A splined coupling 81 (FIGURE 3) is provided and is adapted to be mounted within the bushing 77 for forming a connection between the airplane engine and the drive shaft 82 (FIGURE 7) for the gear pump 42 in the governor. The splined coupling 81 is provided with a snap ring 83 to fix the splined coupling to the drive shaft in a manner well know to those skilled in the art. The splined coupling 81 is actually similar to the coupling utilized in conventional governors except that it has a greater length which will accommodate the thickness of the casing or body 63.

The body 63 is also formed with an arcuate vertical slot or passage 86 which opens into the upper surface 64 and the lower surface 67. This passage serves to connect the engine oil supply to the governor and to the bypass valve as hereinafter described.

A pair of arcuate recesses 87 and 88 are formed in the upper surface 64. One end of the arcuate recess 87 is adapted to communicate with the increased pitch or feathering port 89 (shown schematically in FIGURE 7) of the governor. One end of arcuate recess 88 is adapted to communicate with the decrease pitch or unfeathering port 91 (also shown schematically in FIGURE 7) of the governor.

A pair of recesses 93 and 94 are formed in the lower surface 67 of the body. One end of the recess 93 is in communication with the passage 97 leading from the engine pad (shown schematically in FIGURE 7) and connecting the increase pitch or feathering passage to the propeller assembly. One end of the recess 94 is in communication with the decrease pitch or unfeathering passage 96 (shown schematically in FIGURE 7) leading from the engine pad to the propeller assembly 12.

The shuttle valve 56 previously mentioned is provided with a plurality of spaced lands 56a, 56b, 56c and 56d and is slidably mounted in a bore 101 for movement between first and second positions. The bore 101 is formed of two portions, portion 101a being of a substantially greater diameter than the portion 101b. Land 56d is slidably mounted in portion 101a and is of substantially larger diameter than lands 56a, 56b and 56c. Lands 56a, 56b and 56c are slidably mounted in portion 101b. The shuttle valve 56 may be removed from the casing through an opening which is closed by a threaded cap 102 (FIGURE 2).

An engine oil pressure chamber 103 is provided adjacent the end of the shuttle valve terminating in land 56a. The bore 101 forms chambers 104 and 106 between lands 56a and 56b and 56b and 56c respectively. The bore also forms a chamber 107 between lands 56c and 56d. An auxiliary oil pressure chamber 108 is provided on the other end of the shuttle valve adjacent the land 56d.

A passage 109 provided in the body 63 connects the chamber 106 to the recess 93 when the shuttle valve 56 is in its first or normal position as shown in FIGURE 4. A passage 111 also connects recess 87 to chamber 106 when the shuttle valve is in its normal position. A passage 112 connects recess 88 to chamber 104 and a passage 113 connects recess 94 to chamber 104 when the shuttle valve is in its normal position.

A passage 114 connects the chamber 103 to the slot 86 which is connected to the engine oil supply as hereinafter described.

A passage 117 in the body 63 opens into the side surface 74 and also has its upper portion opening into the portion 101a of the bore 101. The other end of the passage 117 communicates with a bore 118 extending substantially at right angles to the passage 117. The bore 118 is formed in two portions, portion 118b having a diameter slightly less than portion 118a. The bore 118 opens into the side surface 73. A recess 119 is formed in the surface 173 and extends from the bore 118 to a common drain passage 121. One end of the drain passage 121 opens into the surface 73 and the other end opens into a hole 122 provided in the bushing 77. Oil passing from the hole 122 returns to the engine crankcase as hereinafter described.

As hereinafter described, the bore 118 is provided to accommodate the solenoid valve 57. The solenoid valve is of the type well known to those skilled in the art and is provided with an annular row of openings 57a and an outer annular row of openings 57b.

Pressure passages 123, 124 and 126 have their inner ends terminating in an annular groove 127 formed in the bore 118. The annular groove 127 is in communication with the inner row of openings 57a on the solenoid valve 57. The outer end of the pressure passage 123 is connected to chamber 108. The outer end of passage 124 opens into the surface 71 and is adapted to be connected to the pressure port of the pressure cutout switch 58. The outer end of the passage 126 opens into the side surface 72 and is adapted to be connected to the pressure port of the signal switch 59. Drain passages 128 and 129 have their inner ends opening into the common drain passage 121 and have their outer ends opening into the surfaces 71 and 72 respectively and are adapted to be connected to the drain ports of the pressure cutout switch 58 and the signal switch 59 respectively.

A vertical passage 131 has its upper end opening into the surface 68 and has its lower end opening into the bore 101.

The body 63 is also formed with four holes 134 which are adapted to recieve the studs 136 shown in phantom lines in FIGURE 3 and which are normally used for fastening the governor base 66 to the engine pad. The bolts however would have to be of a greater length to accommodate the thickness of the body or casing 63. A plurality of additional holes 137 also are provided in the casing 63 so that the governor bypass valve may be fixed to the engine pad independently of the bolts used for fastening the governor to the engine pad. The holes 137 have been provided with enlarged annular recesses 137a opening into the surface 64 to accommodate the heads of the bolts utilized for fastening the governor bypass valve to the engine pad. Any suitable bolts or studs may be utilized such as those of the internal wrenching type.

As shown particularly in FIGURES 2 and 3, the solenoid switch 57 is mounted on the surface 73, the pressure cutout switch 58 is mounted on the surface 71 and the signal switch 59 is mounted on the surface 72 and are connected to the passages and bores in the casing 63 as hereinbefore described. The solenoid valve, the pressure cutout switch and the signal switch are conventional type well known to those skilled in the art.

The solenoid valve 57, the pressure cutout switch 58 and the signal switch 59 are connected by cables 141, 142 and 143 respectively to electrical circuitry schematically shown in FIGURE 6 and hereinafter described in detail.

Suitable means is provided for connecting passage 117 to the auxiliary pump 52 and passage 131 to passage 144 which leads to the auxiliary check valve 49 on the governor. One means found to be suitable for connecting the passage 117 to the auxiliary pump 52 consists of a swivel connection 146 wihch is connected to piping 147 terminating at the auxiliary pump. Similar means also can be utilized for connecting the passage 131 to the passage 144 and consists of swivel connections 148 and 149 interconnected by piping 151.

In FIGURE 2, my governor bypass valve is shown mounted below the governor and connected to the governor. The conventional connecting cables are provided for the governor as is well known to those skilled in the art. Cable 153 is connected to the step motor electric head 41 whereas cable 154 is connected to the reversing solenoid 48.

A circuit diagram showing the electrical connections to the solenoid valve 57, the pressure cutout switch 58 and the signal switch 59 is shown in the circuit diagram in FIGURE 6 in which the pair of switches and solenoid valve are schematically illustrated. A certain portion of the circuit diagram relating to reversing has been omitted because that portion is substantially conventional and need not be modified for operation with the governor bypass valve.

The auxiliary pump motor 53 is schematically illustrated in the diagram. The circuit diagram also includes a feathering button 156 with a lamp 157 mounted within the feathering button. Depression of the feathering button 156 operates a movable contact bar 158 which engages contacts 1, 2, 3 and 4. Contact 1 is connected to one side of a circuit breaker 159 and the other side of the circuit breaker is connected to a suitable power supply such as 28 volts D.C. which is represented by the battery 161. Contact 2 is connected to the movable contact of the signal light relay 171. The stationary contact of the signal light relay is connected to one side of the lamp 157 and the other side of the lamp is connected to ground as shown. Contact 3 is connected to one side of a current limiting resistor 172 and the other side of the current limiting resistor is connected to one side of a holding coil 173 for the feathering button 156 and the other side of the holding coil 173 is connected to the conductor 142 as shown. The conductor as hereinbefore described is connected to one side of the pressure cutout switch 58 and the other side of the pressure cutout switch is connected to ground as shown.

Contact 4 is connected to one side of the winding for the signal light relay 171 by conductor 174. The other side of the winding of the signal light relay is connected to conductor 143. As hereinbefore described, conductor 143 is connected to one side of the signal switch 59 and the other side of the signal switch is connected to ground as shown. Conductor 174 is also connected to one side of the winding of an auxilairy pump relay 176 and the other side of the winding is connected to ground. Conductor 174 is also connected to conductor 141. As hereinbefore described, conductor 141 is connected to one side of the winding of the solenoid valve 57 and the other side of the winding is connected to ground.

The auxiliary pump relay 176 includes a contact member 177 which is adapted to engage contacts 178 and 179. Contact 178 is connected to one side of a circuit breaker 181 and the other side of the circuit breaker is connected to a suitable power supply such as 28 volts D.C. represented by the battery 161. Contact 179 is connected to one side of the motor 53 and the other side of the motor is connected to the field 182 for the motor and the other side of the field is connected to ground.

In the schematic diagrams in FIGURES 7 through 11, the drain oil passages and the engine oil passages in the governor bypass valve have been connected to the drain oil passages and the engine oil passages in the governor by simulated connecting lines 186 and 187 to facilitate illustration of the operation of the shuttle valve. It is however to be understood that the engine oil is actually supplied to the governor through the slot 86 in the governor bypass valve assembly. Also there are actual drain passages within the governor bypass valve assembly itself which permit the oil to drain directly into the engine crankcase without passing through the governor as shown in the schematic diagram.

To facilitate description of the operation of my feathering apparatus, the increase pitch recesses 87 and 93 can be termed first inlet and outlet passages respectively, decrease pitch recesses 88 and 94 can be termed second inlet and outlet passages respectively and passages 117 and 131 can be termed third inlet and outlet passages respectively. Increase pitch port 89, decrease pitch port 91 and passage 144 of the governor can be termed first, second and third ports respectively.

To also facilitate explanation of the operation of the apparatus the governor is shown connected to an engine oil supply 188 which actually comes through the bypass valve through slot 86. Passages 191, 192, 193, 194, 196 and 197 in the governor have been numbered for the same purpose.

Operation of my apparatus for feathering a propeller may now be briefly described as follows: Let it be assumed that my governor bypass valve has been mounted between the governor and the engine pad as shown in FIGURES 1 and 2 and the hydraulic and electrical connections have been made. Let it also be assumed that the shuttle valve 56 is in its first normal position as shown schematically in FIGURE 7. The shuttle valve is normally held in this position by engine oil pressure which is present in chamber 103. Chamber 103 is connected to the engine oil slot 86 by passage 104 as hereinafter described. Operation of the governor will now be described in conjunction with my governor bypass valve to show that the normal governor functions are unchanged.

Underspeed

First the operation of the governor and the bypass valve will be described when the propeller is in an underspeed condition as shown in FIGURE 7. Thus when the speed of the engine drops below the r.p.m. for which the speeder rack 39 has been set by the step motor electric head 41, the downward force of the speeder spring 37 on the pilot valve 36 of the governor exceeds the upward force on the pilot valve exerted by the flyweights 38. The greater force of the speeder spring 37 moves the pilot valve 36 downwardly.

Downward movement of the pilot valve 36 opens a passage 191 which applies the pressure of the gear pump 42 to the decrease pitch port or second port 91 of the governor. The oil comes from the engine oil supply through the slot 86 in the bypass valve and passes through the booster gear pump 42 and through the check valve 43 and into a chamber formed between the pilot valve 36 and the drive shaft 82 to passage 191 and then to the decrease pitch port 91 of the governor. The decrease pitch port 91 is in communication with one end of the arcuate recess or the second inlet passage 88. The oil under pressure then flows through the arcuate recess 88 into the passage 112 into the chamber 104 into the passage 113 and then into the arcuate recess 94 through the piping 96 to the propeller assembly and into the oil passage 33 in the oil transfer bearing 19 and into the aft or inboard side of the propeller piston 21. The increased pressure against the propeller piston 21 urges the propeller piston outboard or to the left as viewed in FIGURE 7 and causes rotation of the cam motor 22 to decrease the pitch of the propeller blade 26.

Movement of the piston 21 outboard forces return oil out of the dome 18 through the oil passage 29 which may be referred to as the oil transfer tube through passage 31, passage 32 connecting line 97 to the engine pad which has a port which communicates with the recess or first outlet passage 93. The return oil then flows through the passage 109 into the chamber 106 and then into passage 111, then into the arcuate recess or first inlet passage 87 which is in communication with the increase pitch or first port 89 of the governor. The return oil then flows through the governor and downwardly through a vertical passage in the pilot valve to return to the engine oil supply.

The gear pump 42 continues to urge oil under pressure into the aft side of the propeller piston 21 until the blade angle of the propeller has been reduced until the r.p.m. of the engine has increased to the desired speed for which the speeder rack 39 has been set. As the speed of the engine increases, the centrifugal forces on the flyweights increase to progressively lift the pilot valve until the force of the speeder spring 37 is counter-balanced by the forces exerted by the flyweights 38. As the pilot valve 36 is raised, the passages 191 and 192 are progressively closed by lands 36a and 36b to gradually decrease the flow of oil. When the on-speed condition is reached, passages 191 and 192 are both closed by the lands of the pilot valve.

During the on-speed condition, the centrifugal force of the flyweights 38 is balanced by the force of the speeder spring 37. The pilot valve permits sufficient flow of oil to the forward or outboard side of the propeller piston to compensate for internal leakage.

It should be pointed out that there is a centrifugal force acting on each blade of the rotating propeller which includes a component force in a direction such that the resulting twisting moment about the blade center line tends at all times to move the blades towards flat pitch. For that reason the pressure delivered by the gear pump 42 which serves to boost the pressure of the oil from the engine must be sufficient to overcome this twisting moment.

From the foregoing, it is readily apparent that my governor bypass valve does not affect the operation of the governor for controlling the propeller in an underspeed condition.

Overspeed

Figure 8:
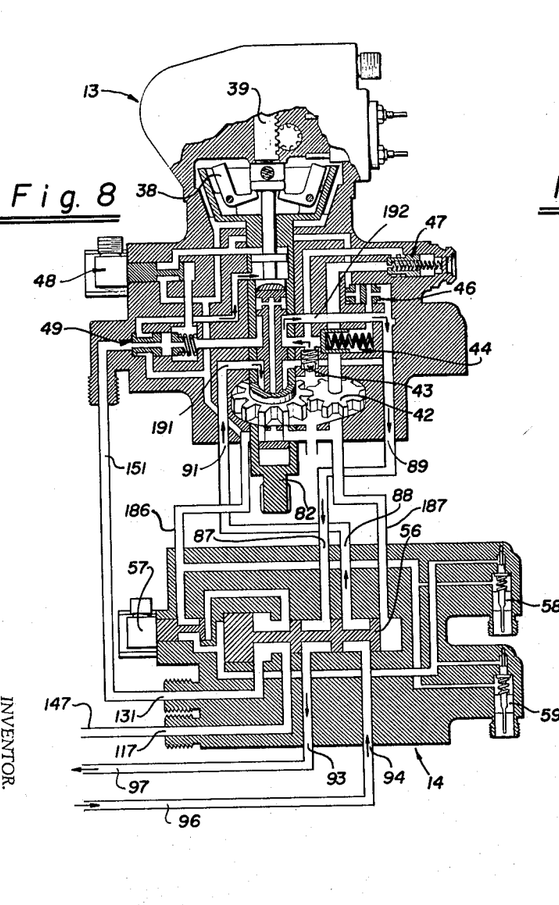
FIGURE 8 is a schematic diagram similar to FIGURE 7 but showing the operation of my propeller feathering apparatus in an overspeed condition of the propeller.

Now let it be assumed that the engine and the propeller are in an overspeed condition. During an overspeed condition, the centrifugal force of the flyweights 38 exceeds the force of the speeder spring 37 and lifts the pilot valve to a position in which passages 191 and 192 are opened. However in this case the pressure from the booster pump 42 is applied through the check valve 43 into a chamber between the pilot valve 36 and the drive shaft 82 and into the passage 192 as shown in FIGURE 8 out the increase pitch port of the governor. The increased pitch port is in communication with one end of the arcuate recess 87. The oil pressure then passes through passage 111 into chamber 106, through passage 109 into arcuate recess 93 to the engine pad which is connected to the passage 32 in the oil transfer bearing 19. The oil then passes through the oil transfer tube 29 and to the forward or outboard side of the piston 21 and serves to urge the piston inboard or to the right as viewed in FIGURE 7 to increase the blade angle of the propeller. Return oil is forced from the aft or inboard side of the piston to the passage 33 through the connecting line 96 to the engine pad which is in communication with the arcuate recess 94. The oil then returns from the arcuate recess 94 through passage 113 into chamber 104 to passage 112 into arcuate recess 88 of the governor bypass valve which is in communication with the decrease pitch port 91. The return oil then flows through passage 191 and returns to the engine oil supply on the other side of the booster pump 42.

Increasing the blade angle of the blades causes a reduction in r.p.m. of the motor which decreases the speed of the motor which decreases the speed of rotation of the flyweights 38. This reduces the centrifugal force exerted on the flyweights. Booster oil is supplied to the outboard side of the propeller until the r.p.m. of the engine has been decreased so that the force exerted on the pilot valve 36 by the flyweights 38 equals the force exerted by the speeder spring 37. As this occurs the pilot valve 36 will move downwardly to close the passages 191 and 192 in the governor.

*Reversing*

Figure 11:
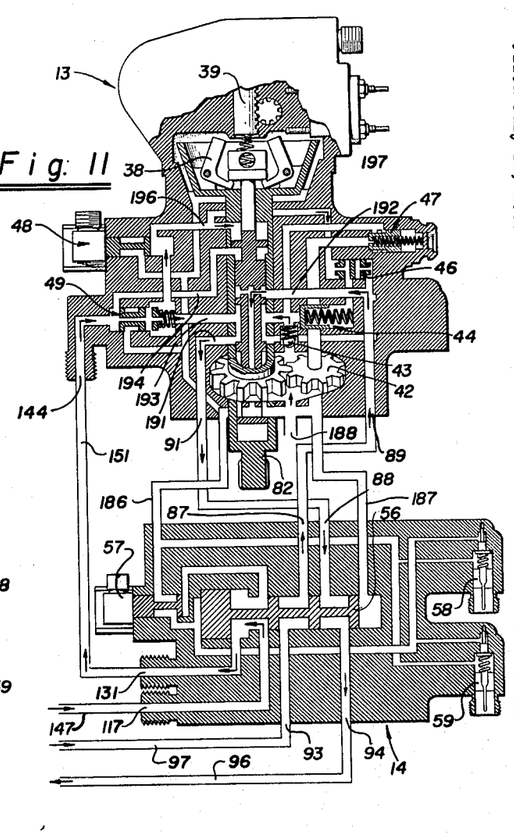
FIGURE 11 is a schematic diagram showing the operation of my propeller feathering apparatus during reversing and unfeathering.

Operation of the governor in conjunction with my governor bypass valve for reversing is shown in FIGURE 11 and will now be described. As is well known to those skilled in the art, reversing is initiated by moving the throttle lever into the reversed portion of the quadrant. In order to move the throttle into the reversed range, it is necessary to touch down, putting weight on the landing gear and energizing the landing gear switch which unlocks the throttle. Contact means (not shown) is provided which is closed when the throttle is moved into a reversed portion of the quadrant to cause energization of the auxiliary pump motor 53 and the reverse solenoid valve 48. Starting of the auxiliary pump motor causes auxiliary oil pressure to be applied to passage 117 in the governor bypass valve through passage 131, piping 151 to the third port 144 of the governor. The third port leads to the auxiliary check valve 49 and the application of auxiliary oil pressure to the check valve causes it to shift to the right as viewed in FIGURE 11 and causes the application of auxiliary oil pressure to both the upper and lower sides of the positioning land 36d and to the upper side of the land 36c of the pilot valve 36. The auxiliary oil pressure is applied to the upper side of the positioning land 36d through passage 196 and is applied to the lower side of the positioning land through passage 194.

Since the area of the upper side of the positioning land 36d is greater than the difference between the area of the lower side of the land 36d and the upper side of the land 36c, the pilot valve is moved downwardly to what is equivalent to an increased pitch position.

At the same time that auxiliary oil pressure is applied to the upper side of the positioning land 36d, auxiliary oil pump pressure is applied to the left side of the selector valve 46 as viewed in FIGURE 7 to move the selector valve to the right which allows auxiliary oil pressure to be applied to the other side of the low pressure relief valve 44 to back up the low pressure relief valve and to place the governor under control of the high pressure relief valve 47.

Auxiliary oil pump pressure is applied to passage 193 and booster pump pressure is applied to the check valve 43 to passage 191 out through the decreased pitch port 91 of the governor and then through the governor bypass valve in a manner similar to that hereinbefore described for the underspeed condition to the aft or inboard side of the propeller piston to move the propeller piston outboard and to decrease the pitch of the blade as the propeller piston is moved outboard. As the propeller piston moves outboard, the blades go through a flat blade position and are moved into a reversed blade angle.

When the propeller has reached a full reversed position, mechanical and/or automatic means (not shown) are normally provided which can be used to terminate the reversing operation by de-energizing the auxiliary pump 53 and the reverse solenoid 48 for relieving the pressure through valving means 31 in the propellers.

*Unreversing*

Figure 9:
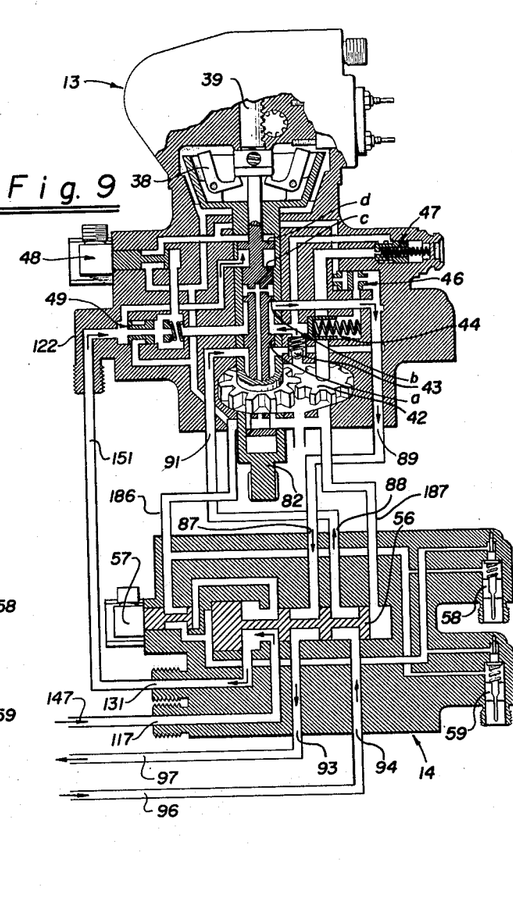
FIGURE 9 is a schematic diagram showing operation of my propeller feathering apparatus during feathering through the governor and unreversing.

Operation of the governor in conjunction with my governor bypass valve for unreversing is shown in FIGURE 9 and will now be described. When the pilot of the airplane moves the throttle forward, contact means is provided for energizing the auxiliary motor relay 176 to energize the auxiliary motor 53 and to start the pump 52 in operation. At the same time means well known to those skilled in the art is also provided for de-energizing the reverse solenoid 48. Auxiliary oil pressure is again applied to the left hand side of the auxiliary check valve 49 to urge the check valve to the right as viewed in FIGURE 9 in a manner identical to that described for the reversing operation in FIGURE 11. De-energization of the reverse solenoid 48 prevents application of auxiliary oil pressure to the top side of the positioning land 36d of the pilot valve. However, auxiliary oil pressure is applied to the bottom side of the positioning land 36d and moves the pilot valve upwardly against the counteracting forces of the flyweights 38 and the speeder spring 37 to place the pilot valve into what is similar to an overspeed condition. At the same time, auxiliary pump and booster pump pressure is applied to the left side of the low pressure relief valve 44 through the selector valve 46 to back up the low pressure relief valve and render it inoperative.

When the propeller has moved from its unreversed position to the flat pitch position, means is actuated well known to those skilled in the art when the propeller has moved through the low pitch position to de-energize the auxiliary motor relay to stop the operation of the auxiliary pump 52 and to return the control of the positioning of the pilot valve 36 to the flyweights 38 and the speeder spring 37 which will return the engine and the propeller to an on-speed condition.

After the auxliary pump 52 has been shut off the auxiliary check valve 49 will be returned to its normal position by the auxiliary check valve spring 50.

*Feathering Through Bypass Valve*

Now let it be assumed that it is desired to feather a propeller. With the connections shown in the circuit diagram in FIGURE 6, feathering will normally take place through my governor bypass valve unless the shuttle valve 56 fails to operate. However, it is within the scope of this invention to provide circuitry by which feathering will normally take place through the governor and that feathering will only take place through my governor bypass valve when the governor is malfunctioning.

To feather a propeller with the circuitry and apparatus shown in the drawing, the feathering push button 156 in FIGURE 6 is first depressed which moves a contact bar 158 into engagement with contacts 1, 2, 3 and 4. Movement of the contact bar 158 to this position energizes the holding coil 173 for holding the feathering push button 156 in the feathering position. This circuit is completed from the positive side of the battery through the circuit breaker 159 to contact 1, contact bar 158, contact 3 through current limiting resistor 172, the holding coil 173, through the pressure cutout switch 58 to ground.

Engagement of the contact bar 158 with contact 4 energizes the winding 176 of the auxiliary pump relay. Energization of the relay 176 causes energization of the motor 53 and operation of the pump 52. The solenoid valve 57 is also energized by contact bar 158 engaging contact 4.

As pointed out previously, the shuttle valve 56 is maintained in its normal position as shown in FIGURE 4 by engine oil pressure which passes from the arcuate slot 86 through the passage 114 to the chamber 103 and engages the positioning land 56a to normally hold the shuttle valve in the position shown in FIGURE 4.

Figure 10:
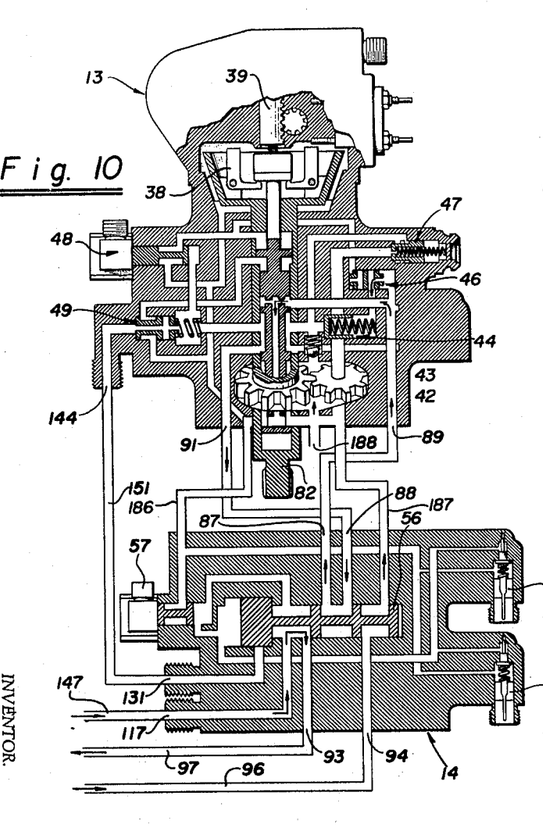
FIGURE 10 is a schematic diagram showing operation of my propeller feathering apparatus while feathering through the additional feathering means.

However, when the auxiliary pump 52 is in operation and when the solenoid valve 57 has been energized, auxiliary pump pressure is applied to chamber 108 which engages the land 56d to urge the shuttle valve to its second position or to the right as viewed in FIGURES 4 and 10. The auxiliary pump pressure is applied from the swivel connection 146 through passage 117 into bore 118 and into the holes 57b provided in the solenoid valve 57 out the holes 57a in the solenoid valve through passage 123 to chamber 108. When the pressure in chamber 108 has been built up to approximately a predetermined value, the shuttle valve 56 will be shifted to the right against the engine oil pressure in chamber 103.

Pressure will also be applied from the openings 57a in the shuttle valve to passages 124 and 126 to apply pressure to the pressure switch 58 and the signal switch 59. The signal switch 59 is normally closed and serves to energize the winding of relay 171 and open its contacts when the feathering button is depressed. When the oil pressure from the auxiliary pump has reached a predetermined value, the contacts of the signal switch open to de-energize the winding of the signal light relay 171 which closes the contacts of the signal light relay to energize the signal lamp 157. The signal lamp 157 serves as indicating means and when lit indicates that the shuttle valve 56 has shifted to its second position and that the auxiliary oil pressure in the bypass valve assembly has reached a certain value.

As soon as the shuttle valve is moved to its second position, and this will only occur when the solenoid valve 57 is energized, auxiliary pump pressure is applied directly to the increase pitch line 97 with no pressure drop in the bypass valve assembly. This pressure is applied from the passage 117 through chamber 107 between lands 56c and 56d on the shuttle valve and through the passage 109, the shuttle valve having moved to the right as that land 56d is to the right of passage 109 as viewed in FIGURE 4, through the recess 93 and out the increase pitch line 97 and to the outboard or forward side of the propeller piston 21 in a manner identical to that hereinbefore described.

The increased pressure in the dome 18 will cause the piston to be moved inboard or to the right as viewed in FIGURE 7 and cause the rotating cam 22 to move the propeller blades to the feathered angle. When the propeller blades have reached a feathered position, they will be up against a mechanical stop and the pressure in the dome 18 will build up. At a predetermined pressure, the pressure cutout switch 58 will be operated to open its contacts to de-energize the holding coil 173 for the feathering button. Release of the feathering button terminates the feathering operation by de-energizing the auxiliary pump motor 53 and the solenoid valve 57. The signal lamp 157 will also be de-energized.

During the feathering operation, the oil on the inboard side of the propeller piston 21 is forced through the line 96 and into the recess 94 through the passage 113 and then through passage 114, land 56a of the shuttle valve being moved to a position to permit access between passages 114 and 113, and through the arcuate slot 86 to the engine oil supply. As hereinbefore explained in the schematic diagrams, the return oil is shown being returned to the engine oil supply through the governor for the sake of convenience and illustration only.

When the shuttle valve is shifted to the right from its first or normal position, the passage 131 connected to the auxiliary pressure check valve 49 is cut off. This is accomplished by the land 56d of the shuttle valve closing off the passage 131. In addition, movement of the lands 56b and 56d of the shuttle valve to the second position interconnects passages 111 and 112 to cause interconnection of the increase and decrease pitch ports 89 and 91 of the governor. Passages 109 and 113 are blocked off from the passages 111 and 112 so that pressure from the governor cannot be applied to the pilot piston 21. It is therefore apparent that regardless of the position of the pilot valve in the governor, any pressure output from the governor will merely be bypassed back to the engine oil return and will in no way be connected to the piping leading to the propeller piston.

*Feathering Through the Governor*

If for some reason the shuttle valve 56 should fail to shift from its first position to its second position, the propeller will still be feathered through the governor to provide alternate feathering means. In feathering through the governor, the feathering operation would be initiated in the same manner hereinbefore described however in this case the auxiliary oil pressure is applied to the auxiliary oil pressure check valve 49 as shown in FIGURE 9. This is apparent in FIGURE 4 in which the passage 117 is directly connected to the passage 131 through which piping 151 is connected to passage 144 and to the auxiliary pressure check valve. The auxiliary pressure urges the check valve to the right as hereinbefore described and causes auxiliary oil pressure to be applied to the lower side of the positioning land 36d of the pilot valve to raise the pilot valve to the increased pitch position. As soon as the pilot valve is moved to an increased pitch position, auxiliary oil passes through the selector valve 46 and backs up the low pressure relief valve to place the governor under the control of the high pressure relief valve 47 as hereinbefore described. The auxiliary oil pressure and the booster pump pressure is applied to the increase pitch port 89 and through the governor bypass valve to the outboard side of the propeller piston. As the piston is forced inboard the rotating cam 22 turns the propeller blades to the feathered angle. The feathering operation can then be terminated normally by the pilot by de-energizing the auxiliary pump motor 53.

*Unfeathering*

To unfeather, the feathering push button 156 is held out manually. Means (not shown) well known to those skilled in the art is provided for energizing the auxiliary pump motor 53 and the reverse solenoid 48.

During normal operation, the shuttle valve 56 is returned to its normal or first position at the time the propeller blades reach the feathered angle and at which time the feathering operation is terminated by operation of the pressure switch 58. As soon as the feathering operation is terminated, the oil head within the governor itself is normally sufficient to move the stuttle valve back to its normal position. However, in the event that it remains in its actuated or second position, the first thing that will occur upon unfeathering is that auxiliary pump pressure will be applied to chamber 107. Since the exposed area of the land 56d is greater than the exposed area of the land 56c in chamber 107, the shuttle valve will be moved to the left as viewed in FIGURES 4 and 11 back to its normal position.

The solenoid 57 has been de-energized as previously described and the chamber 108 is vented to the common drain passage 121 through passage 123, through the solenoid valve 57 and through the slot 119 to passage 121 to the engine oil return.

Application of auxiliary oil pressure to the auxiliary check valve 49 moves the check valve to the right as hereinbefore described and applies auxiliary oil pressure to both the upper and lower sides of the positioning land 36d and to one side of land 36c of the pilot valve as shown in FIGURE 11 to shift the pilot valve downwardly to a decrease pitch position.

The auxiliary pump and the booster pump supply oil pressure to the decrease pitch passage 91 and through the bypass valve in a manner hereinbefore described for the reversing operation to the inboard side of the propeller piston 21. Auxiliary pump pressure also flows through the selector valve 46 and backs up the low pressure relief valve 44 to place the governor under the control of the high pressure relief valve 47. As the propeller piston is forced forward or outboard, the propeller blades are turned towards low pitch and the oil in the outboard side of the piston is forced back to the propeller through the intake side of the booster pump in a manner identical to that hereinbefore described.

The unfeathering action may then be terminated by release of the feathering push button 156. If the feathering push button is held out too long, the auxiliary pump 53 will be shut off automatically several degrees above the low pitch angle by means (not shown) well known to those skilled in the art. After the auxiliary motor 53 has been operated, the propeller returns to the constant speed control of the governor.

From the foregoing it is apparent that the primary purpose of my governor bypass valve is to make possible the feathering of an airplane propeller even though the governor is not functioning. As hereinbefore explained, with my propeller feathering apparatus, feathering normally takes place through my governor bypass valve and will only take place through the governor when the governor bypass valve fails to operate. When feathering is taking place through the bypass valve and when the auxiliary pump pressure has built up to a predetermined pressure, indication means in the form of a lamp 157 will light to indicate that feathering is taking place through the governor bypass valve. If for some reason, the feathering is taking place through the governor rather than through the governor bypass valve, the signal lamp 157 will not be lit which will indicate that feathering is taking place through the governor and not through the governor bypass valve.

It is apparent that my apparatus for feathering a propeller provides additional means completely independent of the governor for feathering the propeller. It also provides back-up feathering means in that failure of my governor bypass valve to operate still permits feathering of the propeller in a conventional manner through the governor. The governor bypass valve assembly has few moving parts and therefore should be relatively trouble free. Utilization of my propeller apparatus for feathering propellers should greatly increase safety in aviation because of the improved feathering. No pressure drop occurs in the bypass valve during the feathering operation and therefore my governor bypass valve provides in effect a greater pump capacity from existing feathering pumps. The use of my governor bypass valve is also particularly advantageous in that it can be installed in existing engine installations without major modifications.

I claim:

1. In a hydraulic propeller system, a variable pitch propeller having hydraulic operating means for adjusting the pitch of the blades of the propeller, a hydraulic governor having a body having a lower section and an upper section valving in the said upper section, said valving serving to control the application of hydraulic fluid to said operating means, said governor having flyweights being located in said upper section and being adjustable to adjust the speed of rotation of the propeller by conditioning of said valving, a first and second source of hydraulic fluid under pressure, means for applying fluid from said first source to condition said valving to cause the application of fluid from said first source to said operating means to effect feathering of the propeller, and additional means in said lower section for effecting feathering of the propeller independently of conditioning of the valving, said last named means comprising fluid passage means in said lower section connected to said operating means, a shuttle valve slidably mounted in a bore formed in said lower section for axial movement between first and second positions to control fluid flow through said fluid passage means, means yieldably urging said shuttle valve to its first position, means for applying fluid from said source to said shuttle valve to move said shuttle valve from its first to its second position against the force of the yieldable means, additional fluid passage means in said lower section connected to second source of fluid under pressure, said shuttle valve in said second position permitting intercommunication between said first named fluid passage and said additional fluid passage to cause the application of fluid from said second source to said operating means to effect feathering of the propeller.

2. In a hydraulic propeller system, a variable pitch propeller having hydraulic operating means for adjusting the pitch of the blades of the propeller, a hydraulic governor having a body including an upper section and a lower section, valving in the upper section, said valving serving to control the application of hydraulic fluid to said operating means, said governor being adjustable to adjust the speed of rotation of the propeller by conditioning of said valving, a source of hydraulic fluid under pressure, means for applying fluid from said source to condition said valving to permit the flow of fluid from said source to said operating means to effect feathering of the propeller, and additional means in said lower section for effecting feathering of the propeller independently of conditioning of the valving, said last named means comprising fluid passage means in said body and connected to said operating means, a shuttle valve slidably mounted in said body for axial movement between first and second positions to control fluid flow through said fluid passage means, means yieldably urging said shuttle valve to its first positon, said shuttle valve remaining stationary and in its first position during conditioning of said valving to adjust the speed of rotation of the propeller, additional fluid passage means in said lower section connected to another source of fluid under pressure, and means in said body to cause the application of fluid from said other source to said shuttle valve to move said shuttle valve from its first to its second position against the force of the yieldable means, said shuttle valve in said second position permitting intercommunication between said first named fluid passage means and said additional fluid passage means to cause the application of fluid to said operating means to effect feathering of the propeller.

3. A hydraulic propeller system as in claim 2 wherein said first named fluid passage means is directly connected to said operating means to permit the free flow of fluid therethrough to the operating means.

4. A hydraulic propeller system as in claim 2 together with fluid passage means connecting said shuttle valve to said valving, said shuttle valve serving to close said last named fluid passage means upon movement to its second position, said last named fluid passage means remaining open when said shuttle valve fails to move to the second position upon application of fluid under pressure to position the same so that hydraulic fluid from said other source is applied through said last named fluid passage means to the valving to effect feathering.

References Cited by the Examiner

UNITED STATES PATENTS

| | | | |
|---|---|---|---|
| 2,276,347 | 3/42 | Ruths et al. | 170—160.22 X |
| 2,280,714 | 4/42 | Martin | 170—160.2 |
| 2,353,566 | 7/44 | Keller | 170—160.2 X |
| 2,361,954 | 11/44 | Martin | 170—160.2 |
| 2,626,669 | 1/53 | Moore | 170—160.21 |
| 2,635,700 | 4/53 | Martin | 170—160.2 |
| 2,663,373 | 12/53 | Richmond | 170—160.2 X |
| 2,754,922 | 7/56 | Berninger | 170—160.21 |
| 2,910,126 | 10/59 | Jedrziewski | 170—160.2 |

FOREIGN PATENTS

| | | |
|---|---|---|
| 1,141,985 | 3/57 | France. |

JULIUS E. WEST, Primary Examiner.

CHARLES F. GAREAU, EMILE PAUL, M. MARLAND, MILTON BUCHLER, Examiners.